United States Patent [19]

Clapper, Jr.

[11] Patent Number: 5,377,975
[45] Date of Patent: Jan. 3, 1995

[54] ELECTRONIC GAMING APPARATUS AND METHOD
[76] Inventor: Ronald C. Clapper, Jr., 20753 Horace St., Chatsworth, Calif. 91311
[21] Appl. No.: 999,268
[22] Filed: Nov. 16, 1992

Related U.S. Application Data

[63] Continuation-in-part of Ser. No. 879,747, May 6, 1992, Pat. No. 5,348,299.
[51] Int. Cl.⁶ ............................................. A63F 9/24
[52] U.S. Cl. ................................. 273/138 A; 235/381; 235/139 R
[58] Field of Search ............... 273/138 A, 138 R, 139; 235/381

[56] References Cited

U.S. PATENT DOCUMENTS 4,725,079  2/1988  Koza et al. .................. 273/139
5,039,848  8/1991  Stoken ........................ 235/381

Primary Examiner—Benjamin H. Layno
Attorney, Agent, or Firm—Robert J. Schaap

[57] ABSTRACT

An electronic gaming apparatus which preferably corresponds to and effectively electronically automates games of chance as for example, that game of chance known as "Pull-Tab." A primary strip of a suitable substrate in the form of a roll is provided in the apparatus. Indicia is printed in individual strip segments and upon actuation of the apparatus, a segment of the strip is severed to provide a strip segment or so-called "game card" ticket and is dispensed. If the indicia on the severed strip segment corresponds to a winning indicia, then the player would win the game or a round of the game. A duplicate copy of each severed segment of the primary strip, and containing the same indicia as the primary strip segment, is maintained on a duplicate strip and stored for purposes of later auditing. In addition, an electronic display is provided on the apparatus. The primary or duplicate strip of indicia contains a code corresponding to the indicia printed on each dispensed strip segment. This code is read as a segment of the strip is dispensed and simultaneously displayed on the screen.

22 Claims, 4 Drawing Sheets

ELECTRONIC GAMING APPARATUS AND METHOD

RELATED APPLICATION

This application is a continuation-in-part of my co-pending U.S. patent application Ser. No. 879,747, filed May 6, 1992 now U.S. Pat. No. 5,348,299, entitled "Electronic Gaming Apparatus and Method."

BACKGROUND OF THE INVENTION

1. Field of the Invention

This invention relates in general to certain new and useful improvements in electronic gaming apparatus and a method of playing a game of chance, and more particularly, to a gaming apparatus which is capable of dispensing selected segments of a strip containing indicia and maintaining a duplicate copy thereof, as well as displaying the indicia on the strip segment which is dispensed.

2. Brief Description of the Prior Art

With the recent advances in electronic circuitry, there have been many attempts to automate games and particularly games of gambling which were heretofore played with little or no electronic game operation. These attempts to automate games have become even more pronounced in view of the recent advances in miniature microprocessor technology.

One of the games, for example, which was previously played without any type of electronic interaction was the game of poker. This necessarily involved a dealer and a plurality of players utilizing playing cards. Recently, however, the game of poker has been automated and can literally be played by actuating selected combinations of push buttons on an electronic gaming device which includes a display screen. Other games involving playing cards have also been automated so as to enable playing on an electronic game apparatus of this type.

In the conventional game of Pull-Tab, frequently played in gaming establishments, a large number of cards, or similar substrates, are located in a box or other open container. Each of the cards are printed with some type of indicia which may be a number, a symbol or the like and only a limited number of the cards in this box or other container have a winning indicia. Each of the indicia are covered by a removable cover sheet having a tab thereon and hence the cards are referred to as "Pull Tabs."

A dealer, upon appropriate payment by a player, will remove one of the cards from the container and provide the same to a player. Since the indicia are covered by the removable cover sheet, and since the cards with winning indicia are randomly located within the container, neither the dealer nor the player know if the player is receiving a card with a winning indicia until such time as the tab is engaged and the cover sheet is removed.

The present invention relies on an innovation which electronically enhances this game of Pull Tab and other similar games which utilize selection of randomly arranged substrates having indicia thereon. The present invention is also applicable to the automating of various other types of games, including games of playing cards, as hereinafter described, and is particularly adaptable to games which have a plurality of substrates bearing indicia thereon in the nature of playing cards or the cards used in a game of chance.

OBJECTS OF THE INVENTION

It is therefore, one of the primary objects of the present inventions to provide an electronic gaming apparatus which is capable of dispensing segments of a strip which contain indicia and where certain of the indicia may represent a winning indicia and to maintain a back-up copy of each segment thus dispensed.

It is another object of the present invention to provide a gaming apparatus of the type stated in which strip segments containing indicia are dispensed and which segments contain a code capable of being read and converted for electronic display of the indicia contained on the dispensed strip segment.

It is a further object of the present invention to provide a gaming apparatus which automates a game of gambling previously played with a plurality of playing tickets in a container and adapted for dispensing from the container.

It is also an object of the present invention to provide a gaming apparatus of the type stated which is highly effective for automating and playing the game known as "Pull Tab."

It is an additional object of the present invention to provide a gaming apparatus of the type stated which can be constructed at a relatively low cost and which is highly adaptable for the playing of a number of games which heretofore were played in an unautomated fashion.

It is another salient object of the present invention to provide a gaming apparatus of the type stated which enables a play of a game involving a betting activity and which is based only on the automation of a previously existing game which does not involve random selection in the gaming apparatus itself and thereby enables the play of a game in many locations where other forms of gaming activities are prohibited.

It is an additional object of the present invention to provide a method of automating a game previously played with playing pieces or substrates dispensed from an open container.

It is still another object of the present invention to provide a method of playing a game involving the dispensing of a segment from a strip containing indicia and where only a selected number of the indicia are winning indicia.

With the above and other objects in view, my invention resides in the novel features of form, construction, arrangement and combination of parts presently described and pointed out in the claims.

BRIEF SUMMARY OF THE INVENTION

The present invention relates to an electronic gaming apparatus, which in a broad aspect, is capable of dispensing a segment of a strip containing indicia thereon upon actuation of the apparatus. In a more preferred aspect, this apparatus maintains a duplicate record of the dispensed segment and particularly the indicia on that dispensed segment.

The electronic gaming apparatus contains a primary strip which can be subdivided into individual segments and where each strip segment contains the indicia thereon. This strip may be in the form of a roll containing the segments and where each segment is capable of being dispensed. The apparatus also comprises a duplicate or secondary strip containing indicia thereon in substantially the same location as on the primary strip. The apparatus further comprises means for severing a segment of the primary strip and dispensing the same upon actuation of the apparatus. This apparatus will store a corresponding portion of the duplicate strip as, for example, on a take-up roll thereof.

There is provided a separating means which separates the primary strip from the duplicate strip after actuation of the apparatus. In addition, a separate means for dispensing is provided which dispenses the substrate segment or so-called "game card" or "ticket" after cutting from the primary strip. The cutting means may be in the form of an anvil and a cutting blade.

In a further embodiment of the invention, the electronic gaming apparatus is also capable of dispensing a segment of a strip containing indicia thereon and which simultaneously displays the indicia of the dispensed segment. This embodiment of the apparatus further includes a means for severing a segment of a primary strip and dispensing the same upon actuation of this apparatus. Further, the apparatus includes means for simultaneously displaying the indicia on the dispensed segment.

In the latter embodiment of the apparatus, there is provided a display screen on the apparatus for displaying the indicia. A code corresponding to the indicia is imprinted on the opposite side of the segment which contains the indicia and the apparatus includes a scanning means for scanning the code and for conversion and display of the indicia.

Preferably, the rear surface of the primary strip will contain the indicia, that is, the side of the strip in facewise contact with the secondary strip. The forward surface of the secondary or duplicate strip also has the same indicia as on the primary strip and in precisely the same location. The rear surface of the duplicate or secondary strip will contain the code which is readable by a scanner. Thus, and in this respect, the duplicate strip will serve as a type of tab and moreover, a tab which is stored. The apparatus of the invention will remove the tab, that is the duplicate strip, from the primary strip, for the user. By virtue of the fact that the indicia on the primary strip are in facewise contact with the duplicate strip, the indicia will always be in unknown to anyone who is playing the apparatus or even monitoring the play of the apparatus until the duplicate strip is separated from the primary strip. The bar code is not readable by the user or observer of the apparatus since the code is only machine readable.

In a more specific form, the electronic gaming apparatus is constructed so that a player may win or lose based on the indicia on the dispensed substrate or substrate segment such that if the indicia correspond to a winning indicia, the player will win. In like manner, if the indicia on the dispensed substrate strip do not correspond to the winning indicia, the player will lose. Thus, the player may actuate the apparatus on numerous occasions in order to enable dispensing strip segments or tickets containing indicia to increase the probability of obtaining a strip segment containing a winning indicia.

On each occasion, the player is usually required to deposit the necessary amount of money in order to actuate the apparatus and thereby play the game. For this latter purpose, the gaming apparatus will be provided with a money-receiving mechanism which will read the money and permit actuation of the game if a proper amount of money has been so deposited. In like manner, the money mechanism may be in the form of a conventional coin mechanism if the game is to be played with coins, or in the form of a bill-reading and accepting mechanism if the game is to be played with paper currency denominations.

The primary strip of the substrate containing a plurality of locations of indicia are provided as indicated above. As also indicated, some of the locations, and only a limited number of the locations, would contain the winning indicia. The locations in which the indicia correspond to a winning indicia are randomly located throughout the locations on the strip.

It can be observed that the gaming apparatus of the present invention is therefore highly effective in enabling the playing of the game of Pull-Tab. In accordance with the conventional game, cards or tickets or other substrates are pulled from a box by a dealer and with each substrate containing an indicia thereon. The indicia which correspond to winning indicia are randomly located throughout this container. In like manner, in the present invention, it can be seen that the indicia corresponding to winning indicia are randomly located throughout the primary strip and hence, the secondary strip as well. Thus, when a player of the game actuates the apparatus to cause the dispensing of a strip segment, this is equivalent to the pulling of a substrate or ticket from an open container. As opposed to pulling a cover sheet from the dispensed strip, the duplicate strip is separated automatically for the player by the apparatus. In this way, the duplicate strip can be saved for purposes of auditing to ensure that there has been no cheating in the random location of the indicia and to prohibit the dispensing to selected customers or players.

While the present invention is highly effective in enabling the play of the game of Pull-Tab, it is also not so limited. The gaming apparatus of the invention is essentially effective in the play of various games, whether or not gambling games, which operate on the basis of dispensing of a substrate, as for example, playing cards or the like. In this case, the apparatus will maintain a duplicate record so that the players themselves can actually examine the record in order to determine what transactions have taken place and to maintain a written memorialization thereof. Further, this gaming apparatus also immediately and automatically provides a display so that all members playing the game can observe the display. For this purpose, the display may be interrupted if desired, particularly if it is necessary to maintain in confidence the indicia on the substrate segment dispensed to any one player.

The present invention thereby provides a unique and novel electronic gaming apparatus which satisfies and fulfills all of the above-identified objects and other objects which will become more fully apparent from a consideration of the forms in which the gaming device may be embodied. One of these forms is more fully illustrated in the accompanying drawings and described in the following detailed description of the invention. However, it should be understood that the accompanying drawings and the detailed description are set forth only for purposes of illustrating the general principles of the invention and are not to be taken in a limiting sense.

BRIEF DESCRIPTION OF THE DRAWINGS

Figure 1:
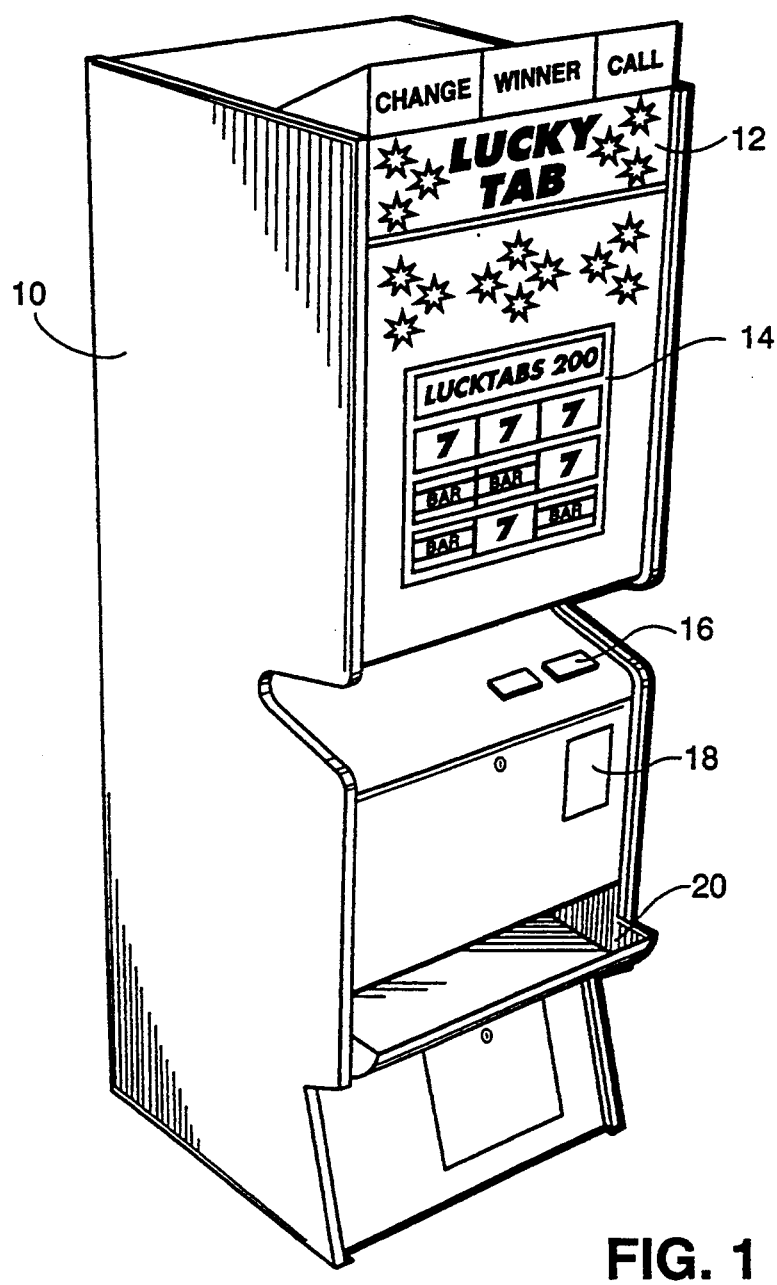
Figure 2:
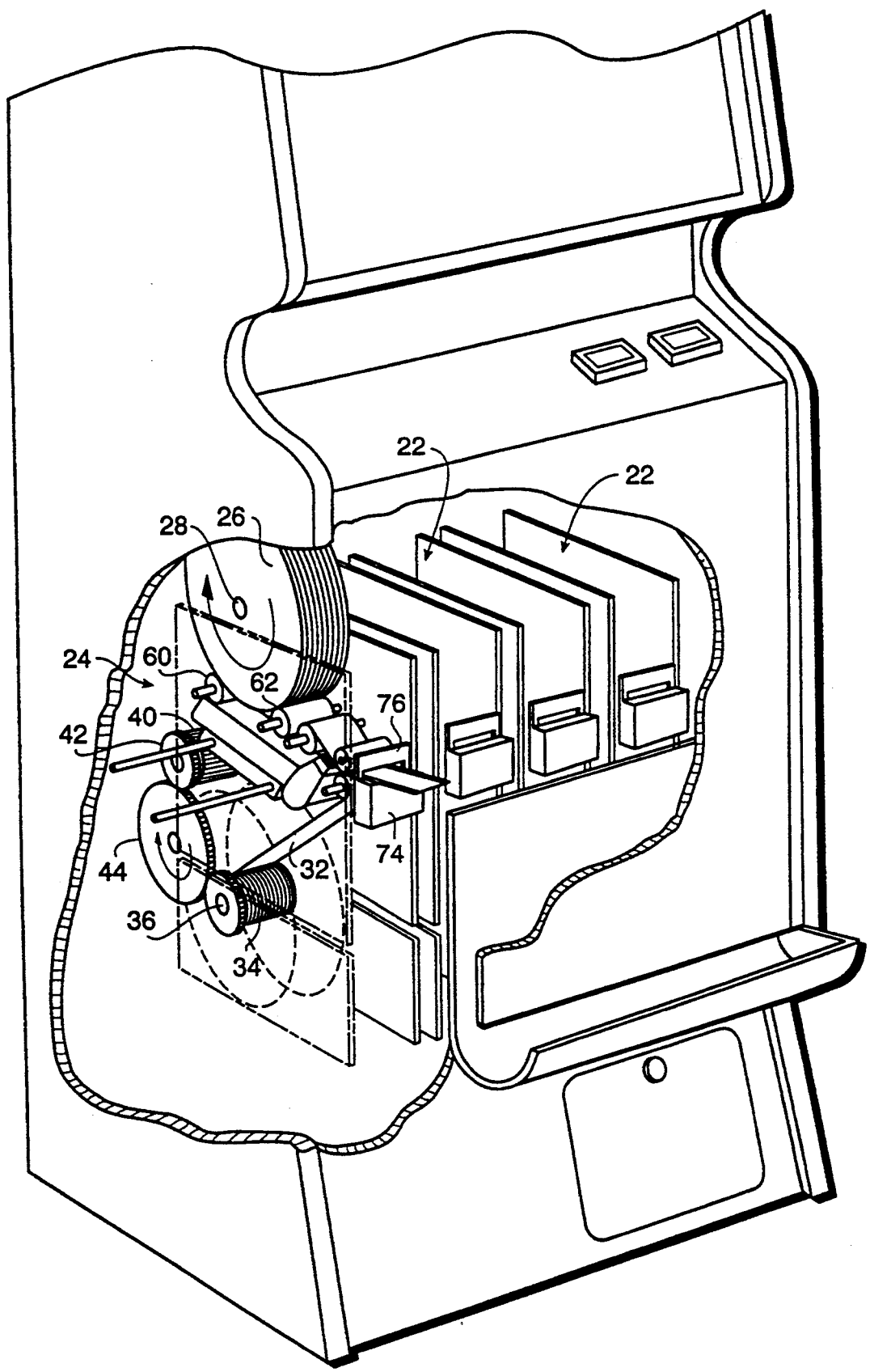
Figure 3:
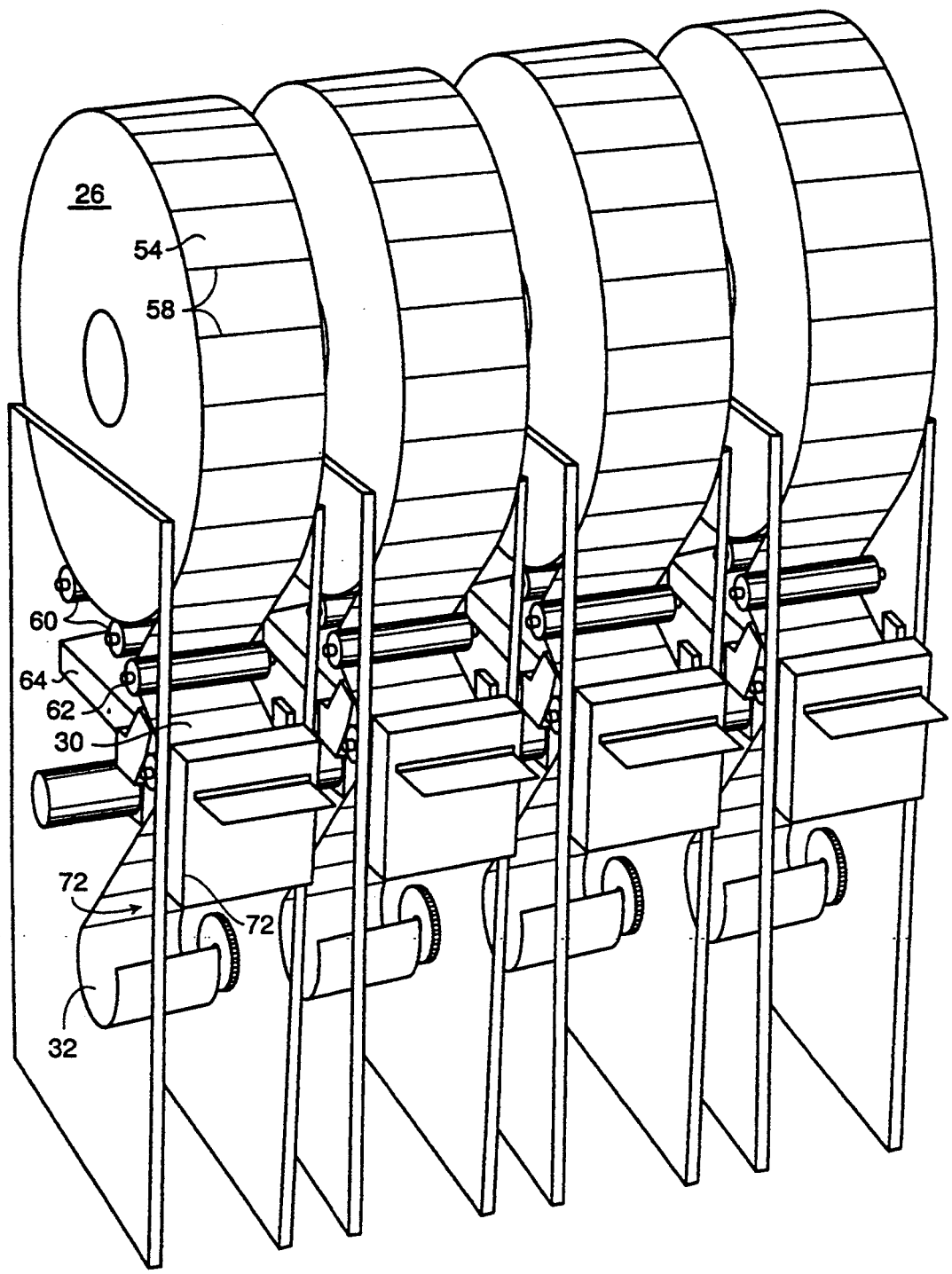
Figures 4, 5:
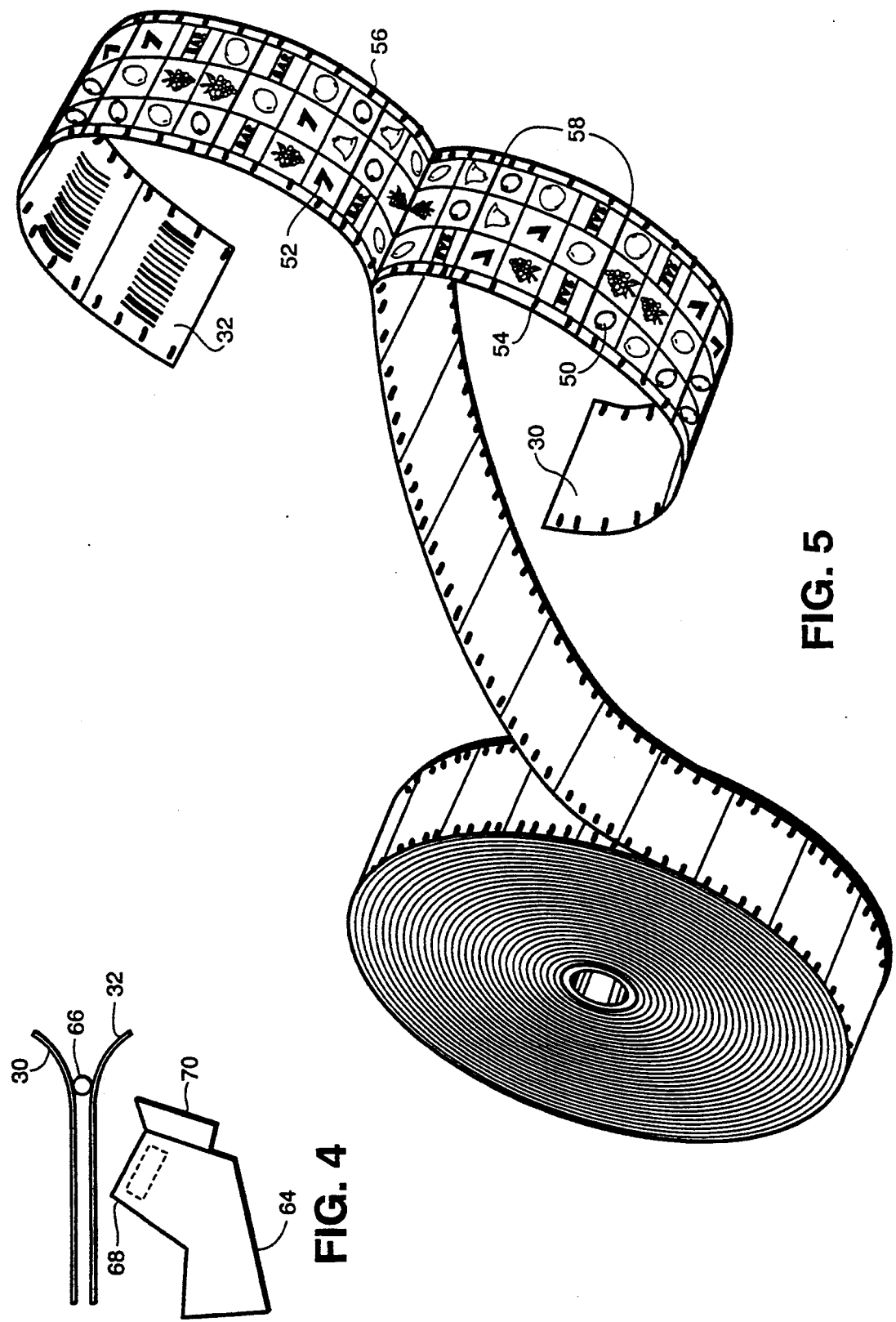

Having thus described the invention, reference will now be made to the accompanying drawings (four sheets) in which:

FIG. 1 is a perspective view of an apparatus constructed in accordance with and embodying the present invention;

FIG. 2 is a fragmentary perspective view partially broken away and in section and showing the major interior components forming part of the apparatus of the invention for severing and dispensing a strip segment along with a take-up mechanism;

FIG. 3 is an enlarged perspective view showing in detail some of the components of FIG. 2;

FIG. 4 is a side elevational view showing a portion of the scanner housing and a separating mechanism forming part of the apparatus of the invention; and FIG. 5 is a perspective view of the primary and juxtaposed duplicate strips.

DETAILED DESCRIPTION OF A PREFERRED EMBODIMENT

Referring now in more detail and by reference characters to the drawings which illustrate a practical embodiment of the present invention, A designates a gaming apparatus comprised of an upstanding housing 10 having a front face 12 with a display screen 14 capable of generating a display of indicia, such as numbers or symbols, on Pull-Tab tickets, or other tickets or substrates, as hereinafter described.

The housing 10 is also provided with a plurality of manually actuable keys 16 which are provided for a user to actuate the apparatus as hereinafter described. The keys represent various functions which the user may select and operate the keys according to the desired function or the desired mode of playing the game.

The gaming apparatus housing 10 is also provided with a money or currency receiver 18, which may be in the form of a coin exchanger for operating the apparatus with coins or in the form of a bill or paper currency reader. When the proper amount of money is introduced into the money receiver 18 the apparatus will be actuated to enable a play of a game and in accordance with actuation of the push button switches 16.

The money receiver 18 may be either coin operated or paper currency operated as aforesaid. In either case, these receivers are conventional in construction and therefore neither illustrated nor described in any further detail herein. However, it should be understood that the money receiver 18 is connected to a microprocessor (not shown) which is properly programmed to operate the apparatus. Thus, and in this case, when an appropriate amount of money has been received, an initiation signal will be sent to the microprocessor and the microprocessor will initiate an actuation signal permitting the apparatus to be operated.

Finally, the housing 10 is also provided with a discharge chute 20 for dispensing of Pull-Tab tickets or other type of gaming substrate segments and which are dispensed in accordance with the play of the gaming apparatus, as hereinafter described.

By reference to FIG. 2, it can be observed that there are a plurality of play stations 22 which may be adapted for sequential play operation or for simultaneous play operation. Thus, the user of the game apparatus may play only one of the play stations, or more than one station simultaneously, depending upon the proper actuation of the push-button switches 16 and upon deposit of the proper amount of money to play the desired number of play stations.

Referring again to FIG. 2, it can be observed that the major portions of the operating mechanism 24 of this apparatus are more fully illustrated. The apparatus comprises a supply spool 26 suitably mounted on a supply spool spindle 28. The supply spool 26 is provided with a primary strip 30 of substrate, in the form of a roll, and which may be dispensed from the supply spool. The substrate material is usually a paper or thin paper-board material, but may effectively adopt any type of rollable or bendable material such as a thin plastic strip, plasticized paper strip, or the like.

The rear face of the primary strip is disposed is facewise engagement with a marginally registered duplicate strip 32 and the latter of which is connected to and trained about a take-up spool 34. The take-up spool 34 is mounted on a spindle 36 which is driven through a drive train 38 including a motor 40 rotating a drive gear 42 meshing with a spur gear 44. In this case, the motor 40 would be actuated under the control of the microprocessor (not shown) upon proper insertion of the selected amount of money and actuation of any one of the manually actuable switches 16.

The microprocessor would be connected to the money receiver so as to initiate a proper energization signal, or actuation signal, when the proper amount of money has been received in the apparatus. This type of construction in which a money receiver is connected to a microprocessor to initiate actuation of an apparatus is known, as for example, in the gaming art industry.

In accordance with the arrangement as illustrated in FIG. 2, it can be observed that the take-up spool 34 is the primary driving member since the supply spool 26 is not driven by the motor 40. It should be understood that other means for driving the supply spool 36 may also be employed and synchronized to the motor 40, if desired.

The primary strip 30 is imprinted on its rear face with a plurality of indicia, such as indicia 50 which may be in the form of numbers, letters, graphic symbols, or the like. It can be seen, by reference to FIG. 4, that the indicia are each located in the individual indicia locations on the primary strip 54 and like individual indicia locations 56 on the secondary strip 32. These indicia locations actually constitute discrete locations which are ultimately severed from the primary roll and constitute a ticket which is dispensed to the player of the apparatus. In the embodiment as illustrated, each indicia location 54 on the primary strip 30 is separated from the next adjacent indicia location by a pair of upper and lower horizontal lines 58. In actuality, it is not necessary for these lines to be printed on the substrate itself.

Each strip segment or ticket is equivalent to a pull-tab in the game of Pull-Tab. In the embodiment as illustrated, each strip segment or ticket is shown as being separated from the next adjacent strip segment on the strip by means of the black horizontal lines 58. In actuality, there may also be score lines at the location of each of these black upper and lower lines 58 which are printed on the substrate. Further, score lines are not necessarily required and do not have to exist as true perforations since the strip itself will be cut into the individual tickets or substrate sections in a manner to be hereinafter described in more detail. The primary strip 30 and the juxtaposed duplicate strip 32 initially lie in facewise contact with one another where the indicia on the rear surface of the primary strip are in facewise contact with the indicia on the forwardly facing side of the duplicate strip. In this way, when the two strips are in such facewise contact, the indicia in each indicia location is essentially hidden from view. Moreover, each of the indicia location are in marginal registration with one another. Thus, each of the indicia on the primary strip are also in marginal registration with corresponding like indicia on the duplicate strip.

The supply spool 26 is supported on a pair of diametrically reduced support rollers 60, as best illustrated in FIG. 3 of the drawings. Moreover, the combined primary and duplicate strips are unwound from the supply spool 26 and trained under a pinch roller 62 which cooperates with one of the support rollers 60, in the manner as illustrated in FIG. 3. The primary strip and the juxtaposed secondary strip are then passed over a scanner housing 64, as best shown in FIGS. 3 and 4, for reasons which will presently more fully appear. Immediately after passing over the scanner housing 64, the two strips are initially separated from one another by a separating mechanism 66 which may be in the form of a simple wire or the like interposed between ends of the two strips which are separated from one another. Any mechanism which is capable of separating the two strips from their juxtaposed relationship, as shown in FIG. 4, may be employed, for this purpose.

The scanner housing 64 is constructed to contain a conventional scanning element 68, such as a charge-coupled diode. However, essentially any conventional scanning element may be employed. In like manner, if desired, a light source 70 could also be located in association with the scanner housing 64 for illuminating the rear surface of the secondary or duplicate strip 32. After separation of the primary strip from the duplicate strip, as best shown in FIG. 4, the primary strip is introduced into the cutting mechanism 72, as hereinafter described in more detail. The duplicate strip 32, however, is wound as a continuous strip on the take-up roller 34.

The rear surface of the duplicate strip 32 contains a bar code in each of the discrete separate locations, as shown in FIG. 5. Accordingly, there will appear on the rear surface of the duplicate strip 32 a separate bar code representative of the indicia on the opposite surface in each indicia location. This bar code is not understandable and readily discernable by visual examination. However, when properly read and converted to corresponding indicia through the microprocessor, that indicia is in a form which can be displayed. Thus each strip segment or ticket will have its own individual bar code corresponding to the indicia printed on the front surface thereof.

The relationship between the indicia and the bar code may be recorded in a storage mechanism and which storage mechanism can form part of the microprocessor or can be connected to and accessible by the microprocessor. In any event, the microprocessor, upon recognizing the bar code, will determine the proper indicia for display. Thereafter, the indicia is displayed on the monitor 14. In this way, the user of the apparatus will receive a ticket as hereinafter described and will also be able to observe the indicia contained on that ticket on the display screen 14.

The cutting mechanism 72 can possibly be a conventional cutting mechanism of the type which is capable of severing a plastic or like sheet strip into individual segments. Furthermore, the cutting mechanism must be electrically operable so that it can be actuated under the control of the microprocessor to sever the strip at a proper location which constitutes an upper or lower margin of each strip segment location.

In the embodiment as illustrated in FIG. 2, the cutting mechanism is in the form of a type of anvil 74 and cutting blade 76. Upon energization of the cutting mechanism as, for example, by a solenoid (not shown), the cutting blade 76 will be pulled downwardly toward the anvil 74 to literally sever a strip segment from the remaining portion of the primary strip. Therefore, upon receipt of a proper signal initiated through the microprocessor, the cutting mechanism 72 will be operated by the solenoid and sever the primary strip 30 into the individual strip segments or tickets. The tickets are thereupon allowed to deposit in the discharge chute 20 where they may be picked up by the player of the apparatus. The tickets can then be taken to a cashier or like individual for purposes of collecting the money if any of the tickets carries a winning indicia thereon.

The rear face of the primary strip 30 which contains the indicia will actually be disposed in intimate facewise contact with the forward face of the duplicate strip 32. Thus, the indicia on the primary strip will not be initially observable until the apparatus separates the duplicate strip from the primary strip and dispenses the strip segment. The rear face of the duplicate strip will contain the bar code 56, as aforesaid, and this bar code is only machine readable, that is, it cannot be intelligibly read by a user or observer of the apparatus. The indicia, therefore, will not be intelligible to the player or observer until the apparatus dispenses the ticket or displays the symbols corresponding to the bar code, or both.

The gaming apparatus and method of the present invention are highly effective in simulating or otherwise automating the conventional game of Pull-Tab, as aforesaid. In this case, and in a conventional Pull-Tab game, the player removes the opaque cover sheet on the tap so that he or she can examine the indicia to thereby determine if that player was or was not a winner. In the game apparatus of the present invention, essentially the same operation is taking place. However, rather then having a dealer select a Pull-Tab or substrate in a random location from a box of like tabs, the apparatus of the invention literally dispenses the next randomly located Pull-Tab or discrete primary strip location. No player, or any other party operating the machine or anyone else, for that matter, will know what indicia is contained on the ticket dispensed to the player until that indicia is either displayed or read from the ticket, or both.

The apparatus of the invention also closely simulates the game of Pull-Tab in that the duplicate strip 32 actually functions as a type of cover strip or opaque substrate. However, as opposed to having the player remove the cover sheet, the apparatus performs that function for the player. Thus, and in this respect, the apparatus of the present invention is highly effective in that it almost completely simulates, or otherwise automates, the game of Pull-Tab and does not detract from any of the features of the game itself.

Thus, there has been illustrated and described a unique and novel electronic gaming apparatus and a method of use therefor which fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. An electronic gaming apparatus capable of dispensing a segment of a strip containing indicia thereon upon actuating the apparatus and which maintains a duplicate record copy, said apparatus comprising:
 a) a primary strip containing indicia thereon;
 b) a secondary strip containing indicia thereon and in essentially the same locations as on said primary strip; and
 c) means for severing a segment of the primary strip and dispensing same upon actuation of the apparatus and storing a corresponding portion of the secondary strip.

2. The electronic gaming apparatus of claim 1 further characterized in that said primary and secondary strips are juxtaposed to one another, and said separating means separates the primary strip from the secondary strip after actuating of the apparatus.

3. The electronic gaming apparatus of claim 2 further characterized in that cutting means severs a segment of the primary strip and enables dispensing of same.

4. The electronic gaming apparatus of claim 3 further characterized in that said primary strip has a plurality of discrete strip segment locations and indicia are located in each of said locations and only a limited number of said locations contain winning indicia, said secondary strip also having a plurality of discrete strip segment locations and in the same positions as on said primary strip, the locations on said secondary strip having the same indicia as on the corresponding location of said primary strip.

5. The electronic gaming apparatus of claim 4 further characterized in that said primary strip has a pair of sides and said indicia are only on one side and not the other, and said secondary strip having a pair of sides and the indicia being only on one side of the secondary strip, the side of the primary strip having the indicia being in facewise contact with the side of the secondary strip having the indicia thereon.

6. The electronic gaming apparatus of claim 4 further characterized:
 a) one of said strips has a code thereon which is machine readable and not readily discernable by visual examination;
 b) means in said apparatus for reading a code corresponding to the indicia of the strip segment which is being dispensed; and
 c) means for displaying the indicia generated from the code and which is the same as the indicia on the strip segment which is dispensed.

7. An electronic gaming apparatus capable of dispensing a segment of a strip containing indicia thereon upon actuating the apparatus and simultaneously displaying the indicia in the dispensed segment, said apparatus comprising:
 a) a primary strip containing indicia thereon;
 b) means for severing a segment of the primary strip and dispensing same upon actuation of the apparatus;
 c) a plurality of machine readable codes associated with the indicia on the primary strip and each code being correlated to a separate one of the indicia, said machine readable codes not being readily discernable by visual examination;
 d) means for reading the machine readable codes of each segment which is dispensed; and
 e) means connecting to said reading means for simultaneously displaying the indicia on the dispensed segment.

8. The electronic gaming apparatus of claim 7 further characterized in that the primary strip is juxtaposed to a secondary strip also containing indicia thereon, and separating means separates the primary strip from the secondary strip after actuation of the apparatus.

9. The electronic gaming apparatus of claim 8 further characterized in that cutting means severs a segment of the primary strip and enables dispensing of same.

10. The electronic gaming apparatus of claim 7 further characterized in that a display screen is on said apparatus for displaying the indicia.

11. The electronic gaming apparatus of claim 10 further characterized in that the machine readable code corresponding to the indicia is imprinted on an opposite side of the segment which contains the indicia and scanning means scans the code for conversion to the display of the indicia.

12. An electronic gaming apparatus in which a player may win or lose based on the indicia on a dispensed substrate such that if the indicia correspond to winning indicia the player will win and if the indicia do not correspond to winning indicia the player will lose, said apparatus comprising;
 a) a primary strip of a substrate containing a plurality of discrete entry locations for indicia and which locations contain selected entries of indicia thereon, and where the indicia corresponding to the winning indicia are randomly dispensed throughout the locations on the strip;
 b) a secondary strip of a substrate having indicia thereon corresponding to the entries of indicia on the primary strip and which entries of indicia are in the same entry locations as on said primary strip and said duplicate strip being in juxtaposed relation to the primary strip;
 c) advancing means in said apparatus for advancing the primary strip and the secondary strip upon actuation by a player and which advancing means causes dispensing of a selected discrete strip segment location of the substrate containing an indicia thereon; and
 d) take-up means for receiving the duplicate strip containing an entry location with the same indicia as that on the primary strip segment location which was dispensed.

13. The electronic gaming apparatus of claim 12 further characterized in that the advancing means is connected to a money receipt mechanism and is actuated only when a selected amount of money is deposited in the apparatus.

14. The electronic gaming apparatus of claim 12 further characterized in that a cutting means is associated with said apparatus and cuts the dispensed selected strip location from the primary strip to enable dispensing thereof.

15. The electronic gaming apparatus of claim 12 further characterized in that the gaming apparatus aids in the game of Pull-Tab and each dispensed location constitutes a separate Pull-Tab.

16. The electronic gaming apparatus of claim 12 further characterized in that said primary strip has a plurality of discrete locations and indicia are located in each of said locations and only a limited number of said locations containing winning indicia, said secondary strip also having a plurality of discrete entry locations and in the same positions as on said primary strip, the locations on said secondary strip having the same indicia as on the corresponding locations of said primary strip.

17. The electronic gaming apparatus of claim 16 further characterized in that said primary strip has a pair of sides and said indicia is only on one side and not the other and said secondary strip has a pair of sides and the indicia being only on one side of the secondary strip, the side of the primary strip having the indicia being in facewise contact with the side of the secondary strip having the indicia thereon.

18. The electronic gaming apparatus of claim 12 further characterized in that:
 a) one of said strips has a code thereon which is machine readable and not readily discernable by visual examination on one of said strips;
 b) means in said apparatus for reading a code corresponding to the indicia of the strip segment location which is being dispensed; and
 c) means for displaying the indicia generated from the code and which is the same as the indicia on the strip segment location which is dispensed.

19. A method of playing a game of chance where a player obtains a ticket containing indicia and in which the player will win a game if the indicia on the ticket correspond to winning indicia, said method comprising:
 a) actuating an apparatus containing a primary strip of indicia with a plurality of discrete selected locations with each location containing indicia thereon and only a limited number of the locations containing winning indicia thereon;
 b) advancing the primary strip of indicia and simultaneously advancing a secondary strip in juxtaposed relation to the primary strip, said secondary strip also containing the same discrete selected locations with each location of the secondary strip containing corresponding indicia to a like location on the primary strip;
 c) separating the primary strip from the secondary strip during the advancing of the strip;
 d) sensing a discrete location at an end of said primary strip upon actuation of said apparatus to form a discrete ticket containing indicia;
 e) dispensing the selected severed discrete ticket having indicia thereon to the player of the apparatus; and
 f) maintaining a duplicate record of the dispensed ticket by storing the secondary strip for later examination or auditing.

20. The method of claim 19 further characterized in that said method comprises randomly locating the winning indicia throughout the selected discrete locations.

21. The electronic gaming apparatus of claim 19 further characterized in that said primary strip has a pair of sides and said indicia being only on one side and not the other and said secondary strip having a pair of sides and the indicia being only on one side of the secondary strip, said method comprises disposing the side of the primary strip having the indicia in facewise contact with the sides of the secondary strip having the indicia thereon.

22. The electronic gaming apparatus of claim 19 further characterized in that one of said strips has a code thereon which is machine readable and not readily discernable by visual examination on said strip, said method comprising reading the code corresponding to the indicia of the ticket which is being dispensed, and displaying the indicia generated from the code and which is the same as the indicia on the ticket which is dispensed.

* * * * *